United States Patent [19]

Tsuchiya et al.

[11] Patent Number: 5,671,198

[45] Date of Patent: Sep. 23, 1997

[54] DISK SYSTEM CAPABLE OF ARBITRARY INSERTION AND EJECTION OF DISKS DURING REPRODUCTION AND RECORDING OPERATIONS

[75] Inventors: Tatsuhiko Tsuchiya; Kenji Yatsu, both of Iwaki, Japan

[73] Assignee: Alpine Electronics, Inc., Tokyo, Japan

[21] Appl. No.: 398,620

[22] Filed: Mar. 1, 1995

[30] Foreign Application Priority Data

Mar. 4, 1994 [JP] Japan .................. 6-060230

[51] Int. Cl.[6] .................................. G11B 17/00
[52] U.S. Cl. ........................................ 369/34
[58] Field of Search ..................... 369/34, 36, 38, 369/178, 191, 192, 193, 194, 195; 360/92, 98.04, 98.05, 98.06

[56] References Cited

U.S. PATENT DOCUMENTS

| | | | |
|---|---|---|---|
| 4,695,990 | 9/1987 | Kawakami | 369/36 |
| 5,006,940 | 4/1991 | Hamachi et al. | 360/92 |
| 5,058,090 | 10/1991 | Ueno et al. | 369/36 |
| 5,123,000 | 6/1992 | Fitzgerald et al. | 369/36 |
| 5,123,001 | 6/1992 | Nakamichi et al. | 369/36 |
| 5,161,138 | 11/1992 | Caspers | 369/36 |
| 5,210,728 | 5/1993 | Noguchi et al. | 369/36 |
| 5,289,441 | 2/1994 | Domberg et al. | 369/34 |
| 5,384,760 | 1/1995 | Kumakara | 369/38 |
| 5,392,266 | 2/1995 | Kobayashi et al. | 369/36 |
| 5,481,514 | 1/1996 | Yamasaki et al. | 369/191 |
| 5,493,556 | 2/1996 | Aoki et al. | 369/191 |

FOREIGN PATENT DOCUMENTS

0163463  12/1985  European Pat. Off. .

*Primary Examiner*—Stuart S. Levy
*Assistant Examiner*—David D. Davis
*Attorney, Agent, or Firm*—Guy W. Shoup; Patrick T. Bever

[57] ABSTRACT

A disk-selective disk system is capable of holding a plurality of disks such as compact disks (CDs), mini-disks (MDs), CD-ROM disks, floppy disks, or other types of disks for reproducing and recording data, wherein a selected disk can be ejected from a disk container even if another disk is loaded in the disk drive and is being driven for reproduction or recording. Cartridges each having a disk therein are inserted into a disk container through an insertion slot. A movable base, which moves up and down in a housing, is provided with a drive unit, and any of the cartridges can be taken into a cartridge holder by selective movement of the movable base for reproduction. When a disk in any cartridge is being driven for reproduction or recording in the drive unit, the movable base is moved up or down and stopped in a position where an eject member is positioned opposite to any cartridge in the disk container, and the eject member is activated, whereby the cartridge in the disk container can be ejected from the disk container through the insertion portion even if another disk is simultaneously loaded in the disk drive.

15 Claims, 6 Drawing Sheets

DISK SYSTEM CAPABLE OF ARBITRARY INSERTION AND EJECTION OF DISKS DURING REPRODUCTION AND RECORDING OPERATIONS

BACKGROUND OF THE INVENTION

1. Field of the Invention

The present invention relates to a disk system which holds a plurality of disks, such as compact disks or mini-disks, which are either unprotected or protected by a cartridge, and more particularly, to a disk system capable of arbitrarily accepting and ejecting individual disks whether or not one of the disks is engaged in a recording or reproduction operation.

2. Description of the Related Art

Figure 7:
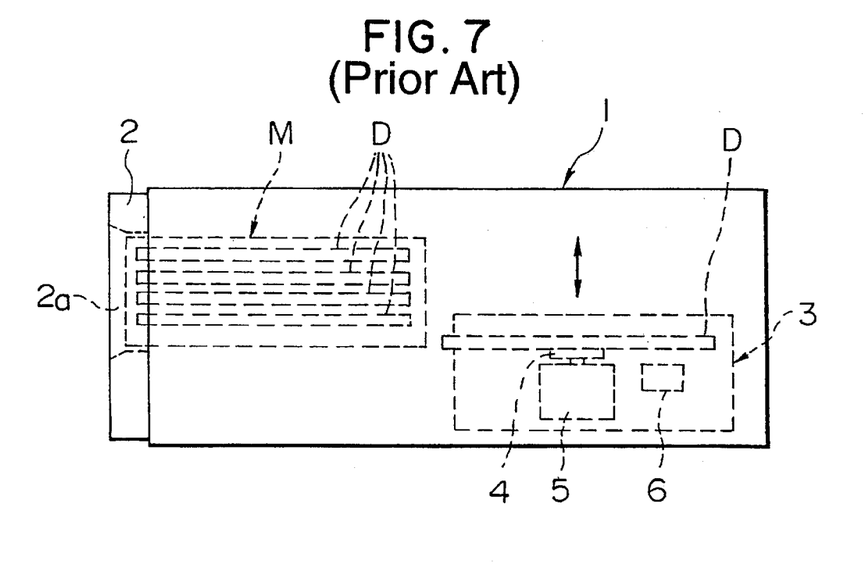
FIG. 7 is a side view showing the structure of a conventional disk-selective disk system.

FIG. 7 is a side view of a conventional disk-selective disk system (also called "a disk changer"). The conventional disk system of FIG. 7 includes a decorative portion 2 disposed in front of a housing 1. Decorative portion 2 includes an insertion opening 2a through which a magazine M can be loaded. Magazine M accommodates a plurality of disks D which are loaded therein. The disks D can be compact disks (CDs), which are typically unprotected by a cartridge, or alternatively, disks D can be mini-disks (MDs) which are protected by a cartridge.

A disk drive 3 is mounted in the housing 1. Disk drive 3 is comprised of a turntable 4, a spindle motor 5 for rotationally driving the turntable 4, and an optical head 6. In FIG. 7, the disk drive 3 is moved in the upward and downward directions by a movement drive source (not shown) mounted in housing 1 so that disk drive 3 can be positioned opposed to any disk D in magazine M. Then, the disk D is drawn from magazine M, loaded on turntable 4 in disk drive 3, where disk D is rotationally driven by the spindle motor 5.

In this conventional disk-selective disk system, a plurality of disks D are inserted in the magazine M in advance. The magazine M is loaded in the housing 1, and ejected from the housing 1, by an eject mechanism (not shown) mounted in the housing 1. Therefore, if one or more of the disks D in the magazine M are expected to be exchanged, it is necessary to take the magazine M out of the housing 1 and to replace a given one of the disks D contained in the magazine M with an exchange disk, requiring substantial time and effort.

Furthermore, with conventional disk system 7, when any of the disks D are loaded in the disk drive 3 to be reproduced it is returned into its initial space in the magazine M after the reproduction is completed. If the magazine M is ejected from the housing 1 while the disk D is being loaded on the turntable 4, the disk D cannot be returned to its location in magazine M. Therefore, the conventional disk system 7 prohibits the ejection of the magazine M when one of the disks D is loaded in the disk drive 3. If the eject button (not shown) for the magazine M is pressed while one of the disks D is loaded in the disk drive 3, the reproduction of one of the disks D loaded in disk drive 3 is interrupted, the disk D is returned into the magazine M, and then, the magazine M is ejected from the housing 1. As a result, there is a significant delay between when the eject button is pressed until the ejection of the magazine M is actually completed.

SUMMARY OF THE INVENTION

In accordance with the present invention the problems discussed above are solved by providing a disk system, with a plurality of disks loaded therein, which allows any of the disks to be arbitrarily selected and ejected at any time. According to the invention, any of the disks can be ejected even if another disk is being driven for reproduction (i.e., played) or for recording (i.e., having information recorded onto the disk), thereby facilitating the handling of the disks.

According to the present invention, there is provided a disk system including: an insertion portion through which a plurality of disks are individually inserted; a disk container for holding the individually inserted disks; a disk drive for loading any of the disks selected from the disk container; an eject member for selecting any of the disks contained in the disk container and ejecting a disk from the insertion portion; an eject drive source for operating the eject member; and a control device for controlling the eject drive source whether or not any disk is loaded the disk drive and whether or not that disk is being driven for reproduction or recording.

In one embodiment of the invention, the structure described above further includes a movable base for supporting the disk drive and a movement drive source for moving the movable base to be positioned opposite to any of the disks in the disk container. Thus, the eject member is moved together with the disk drive by the power of the movement drive source to a position where it can eject any of the disks from its position in the disk container.

According to the invention, disks can be individually inserted into the disk container through an insertion portion. Therefore, it is possible to insert only an arbitrary number of disks into the disk container at any time. For instance, one, two or several disks can be inserted depending on the needs of the user since, according to the invention, the eject member is provided to select and eject individual disks, it is possible to select and eject only the desired number of disks (i.e., one or several disks) from the disk container. In addition, since the driving of the eject drive source for operating the eject member is controlled whether or not any disk is loaded into the disk drive and whether or not a disk is being driven for reproduction or recording operations, an arbitrary disk can be ejected without interrupting a disk which is being played or having information recorded, i.e., a disk loaded into and being driven in the disk drive.

When the disk drive is supported by the movable base, the eject member moves to a position where it can eject any disk in correlation to the movement of the movable base. In other words, in order to eject any disk, the movable base moves and the eject member moves to a position opposite to the selected disk together with the disk drive. When the eject member is operated in that position by the eject drive source, the disk is ejected from the disk container through the insertion portion even if another disk is loaded into the disk drive and even if that disk is being driven in the disk drive.

According to the invention, it is only necessary to move the movable base for supporting the disk drive in order to position the eject member opposite any disk. Therefore, no mechanism for selectively moving only the eject member is needed. In other words, the movement drive source for the movable base, which is used to select any disk from the disk container and load the disk in the disk drive, can also serve as a drive source for the selective movement of the eject member. This simplifies the structure of the disk system.

DESCRIPTION OF THE PREFERRED EMBODIMENTS

The preferred embodiments of the present invention are described with reference to the attached drawings.

Figure 1:
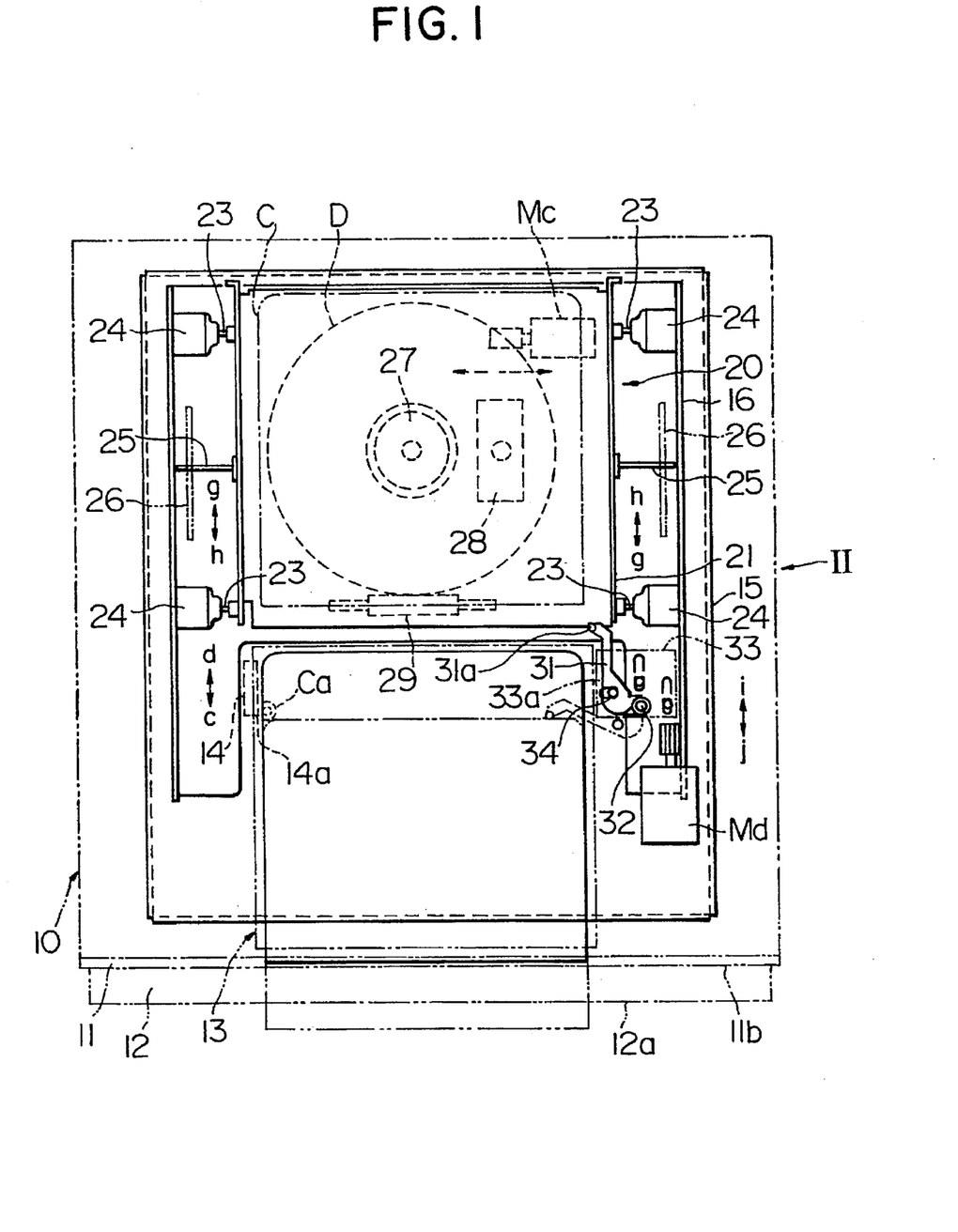
FIG. 1 is a plan view of an on-board automotive disk system according to one embodiment of the present invention.
Figure 2A:
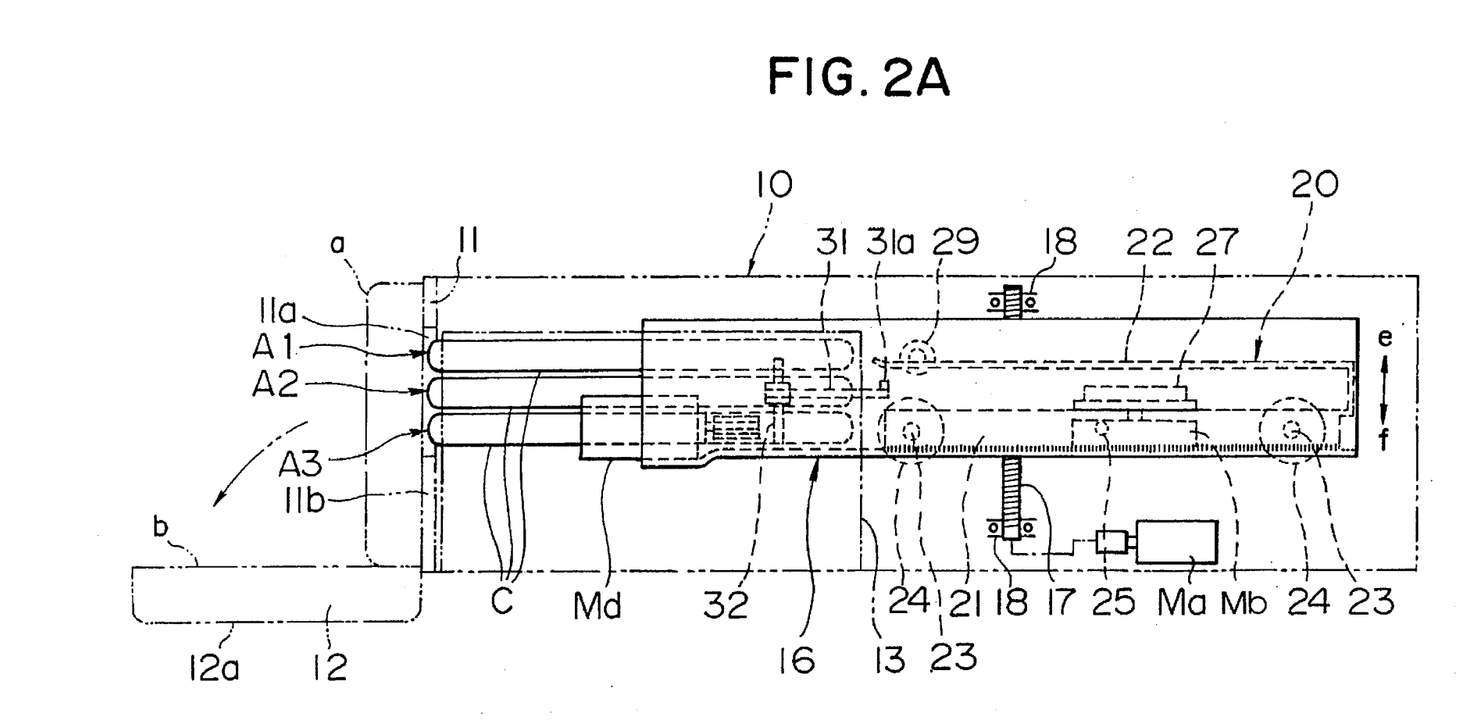
FIG. 2A is a side view as seen from a direction indicated by arrow II of FIG. 1.
Figure 2B:
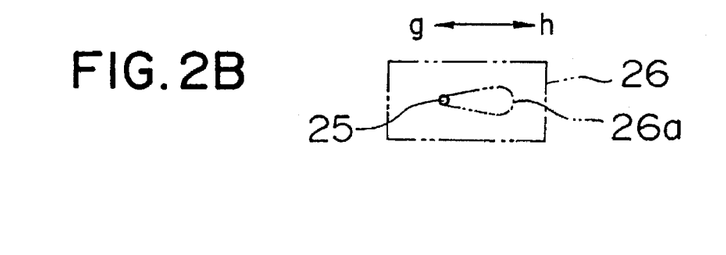
FIG. 2B is a partial side view showing the structure of the restraint member of FIG. 2A.
Figure 3:
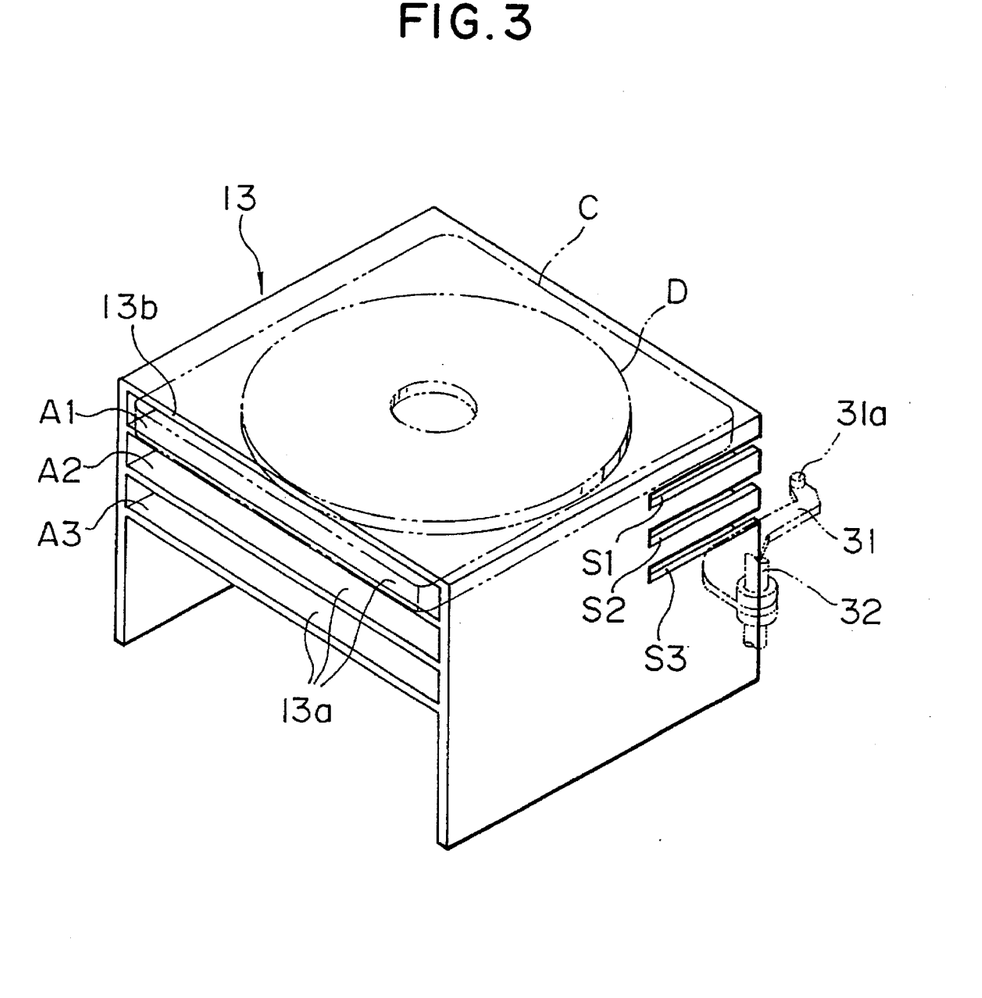
FIG. 3 is a perspective view showing a disk container and an eject member.
Figure 4A:
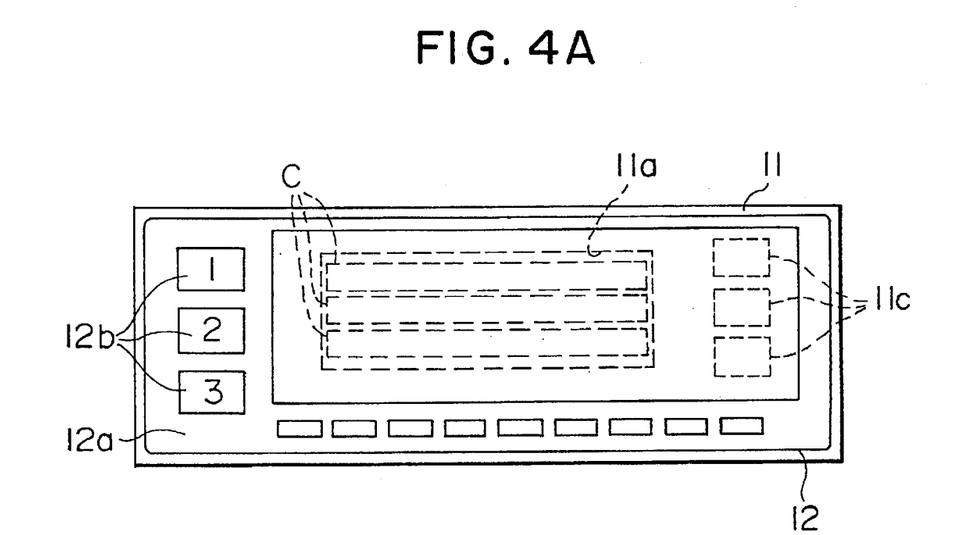
FIG. 4A is a front view of one embodiment of the invention showing the cover of the on-board automotive disk system in the closed position.
Figure 4B:
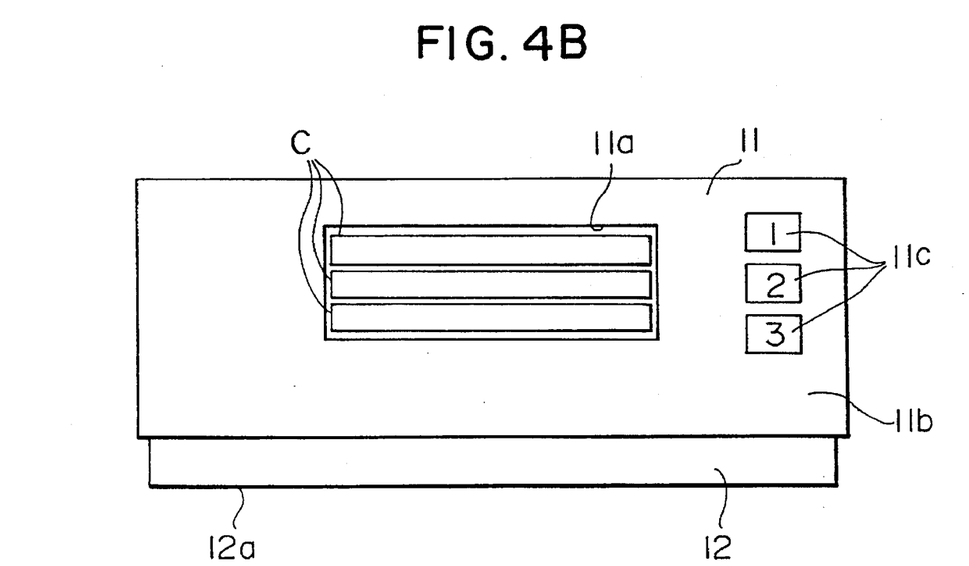
FIG. 4B is a front view of one embodiment of the invention showing the cover in the open position.

FIG. 1 is a plan view of an on-board automotive disk system according to one embodiment of the invention. FIG. 2A is a side view as seen from a direction indicated by arrow II in FIG. 1. FIG. 2B is a partial side view showing the structure and movement of a restraint member according to the invention. FIG. 3 is a perspective view showing the spatial relationship between a disk container and an eject member according to the invention. FIG. 4A is a front view showing the cover of the on-board automotive disk system according to the invention in the closed position. FIG. 4B is a front view showing the cover of the on-board automotive disk system in the open position.

A nose portion 11 (See FIGS. 1 and 2A) is attached in front of a housing 10. The nose portion 11 pivotally supports a cover 12 at the bottom of nose portion 11. Nose portion 11 includes an insertion slot 11a (see FIG. 2A) for the insertion of disks D. Eject control buttons 11c (See FIG. 4B) are provided on a front surface 11b of the nose portion 11 to manually initiate the ejection of disks D.

When the cover 12 is in position (a) as shown in FIG. 2A, the insertion slot 11a is covered and the eject control buttons 11c are hidden as shown in FIG. 4A. When the cover 12 is pivoted to position (b) shown in FIG. 2A, the insertion slot 11a is open and the eject control buttons 11c are exposed and accessible as shown in FIG. 4B to be operated. On a front surface 12a of the cover 12, control buttons 12b are provided to initiate disk selection and reproduction (see FIG. 4A).

A disk container 13 (See FIGS. 2A and 3) is mounted on the inside of the nose portion 11 in the housing 10. The disk container 13 is shaped like a box as shown in FIG. 3, and includes dividers 13a which, in one embodiment of the invention, are in plate form. A plurality of disk holders A1, A2 and A3 (also called disk holders A1, A2, A3) are formed between the dividers 13a and between the topmost divider 13a and a ceiling plate 13b. The embodiment of the invention shown in FIG. 3 has three dividers 13a. However, in other embodiments of the invention the number of dividers 13a can be more or less depending on the needs of the buyer. Disks D are contained in the respective disk holders A1, A2 and A3.

The disks D are, for example, mini-disks (MDs), i.e., small disks which typically include a casing, compact disks (CDs), floppy disks, CD-ROM disks, or other types of disks for reproducing and/or recording optical or magnetic information. When mini-disks are used, each of the disks D is housed in a cartridge C made of plastic (See FIGS. 1 and 2A). The cartridge C has a center hole, where the center of the disk is exposed on the lower side of the disk. A shutter is formed on the cartridge C (not shown) which, when open, exposes a recording surface of the disk.

When the cover 12 pivots to the position (b) shown in FIG. 2A, the cartridges C, each having a disk D therein, are inserted into the disk holders A1, A2 and A3 through the insertion slot 11a (see FIG. 4B). The size of the insertion slot 11a is wide enough to communicate with all the disk holders A1, A2 and A3. When cover 12 is open (position (b) in FIG. 2A), the cartridges C can be individually inserted into the disk holders A1, A2 and A3.

Each of the disk holders A1, A2 and A3 in the disk container 13 is provided with a holding mechanism (not shown) including a leaf spring for temporarily holding the cartridge C when cartridge C is inserted through the insertion slot 11a. In one embodiment of the invention, the leaf spring is mounted on a top surface in each of the disk holders A1, A2 and A3, whereby the inserted cartridge C is held in position against the bottom of each disk holder A1, A2 or A3.

As shown in FIG. 3, three slits S1, S2 and S3 are formed at the right rear end of the disk container 13. The slit S1 leads to the topmost disk holder A1, and the slits S2 and S3 lead to the disk holders A2 and A3, respectively.

Transport members 14 are mounted on the left side of the disk container 13 as shown in FIG. 1. Transport members 14 are provided for the disk holders A1, A2 and A3. Transport members 14 move in directions (c)-(d) as shown in FIG. 1. Each transport member 14 has a claw 14a facing a respective disk holder A1, A2 or A3. The claw 14a is urged to protrude in the disk holders A1, A2 or A3 by the action of a spring or similar mechanism (not shown). When the cartridge C is inserted in the disk holder A1, A2 or A3, the claw 14a engages a groove Ca (See FIG. 1) formed on the left side of the cartridge C. If the cartridge C is ejected through the insertion slot 11a, the claw 14a of the transport member 14 can retreat in the left-ward and outward direction from the disk holder A1, A2 or A3.

A mechanism chassis 15 is, as shown in FIG. 1, mounted inside the housing 10. The mechanism chassis 15 is formed by bending and shaping a metallic plate. The mechanism chassis is provided with a movable base 16 (See FIG. 2A). As shown in FIG. 2A, the movable base 16 can move in the upward and downward (e)-(f) directions within mechanism chassis 15. The up-and-down movement of mechanism chassis 15 allows selective movement for selecting any cartridge C with a disk D therein held in the disk container 13.

Various kinds of mechanisms may be adopted to selectively move the movable base 16 up and down. In the embodiment shown in FIG. 2A, a screw shaft 17 is employed. Screw shaft 17 is rotatably supported by bearings 18 located in the upper and lower positions of the mechanism chassis 15. A female screw member fixed to the movable base 16 is fitted on the screw shaft 17. This fit allows the movable base 16 to move up and down when the screw shaft 17 is rotationally driven by a selective movement motor Ma (see FIG. 2A) fixed to the mechanism chassis 15. In other words, the selective movement motor Ma functions as a movement drive source for selectively moving the movable base 16 and the screw shaft 17. A power transmission mechanism from the selective movement motor Ma to the screw shaft 17 constitutes a selective movement mechanism for moving the movable base 16.

A drive unit 20, which functions as a disk drive, is supported by movable base 16 (See FIGS. 1 and 2A). As shown in FIG. 2A, the drive unit 20 comprises a unit chassis 21 and a cartridge holder 22 positioned above the unit chassis 21. The cartridge holder 22 is dimensioned so as to hold the cartridge C and is continuously positioned on the unit chassis 21. If the disk D is not protected by the cartridge C, e.g., if disk D is a CD, the cartridge holder 22 serves as a disk holder. Therefore, cartridge holder 22 functions as a disk holding portion of drive unit 20.

Two support shafts 23 (See FIG. 1) are fixed to either side of the unit chassis 21 and two dampers 24 are fixed to each inner side plate of the movable base 16. The dampers 24 are each formed by sealing a high-viscosity fluid, such as oil or air, into a rubber bag. Each support shaft 23 is held in position by being inserted in the bag portion of the damper 24 (as shown in FIG. 1). Therefore, the drive unit 20 is elastically supported relative to the movable base 16 by the dampers 24 acting as elastic members. Alternately, springs may be used instead of the dampers 24 to elastically support the drive unit 20 relative to the movable base 16.

Lock shafts 25 are fixed to both sides of the unit chassis 21 in the drive unit 20 and a pair of restraint members 26 are mounted inside the movable base 16 (See FIG. 1). Each restraint member 26 has a restraint hole 26a (See FIG. 2B), in which the lock shaft 25 is fitted. Referring to FIG. 2B, when the restraint member 26 shifts in direction (g), the lock shaft 25 is moved into a major diameter portion of the restraint hole 26a and the drive unit 20 is not restrained. When restraint member 26 is in this position, the drive unit 20 is elastically supported by the dampers 24 in the movable base 16. When the restraint member 26 shifts in direction (h), the lock shaft 25 is held by a minor diameter portion of the restraint hole 26a. The direction (g)–(h) and the movement directions of one of the restraint members 26, which are located on the left and right sides in FIG. 1, are opposite to those of the other restraint member 26. When the restraint member 26 on the right side of FIG. 1 moves in the upward (h) direction, the restraint member 26 on the left side moves in the downward (g) direction, both the lock shafts 25 are restrained by their respective restraint members 26. When lock shafts 25 are so restrained, the drive unit 20 is not elastically supported relative to the movable base 16, but is instead restrained integrally with the movable base 16.

A turntable 27 and a spindle motor Mb for rotationally driving the turntable 27 are mounted on the unit chassis 21 of the drive unit 20 (See FIG. 1). Although the turntable 27 protrudes into the cartridge holder 22 in FIG. 2A, it retreats below the lower surface of the cartridge holder 22 when the cartridge C is moved from the disk container 13 into the cartridge holder 22. When the cartridge C is completely transferred into the cartridge holder 22, the turntable 27 moves upward and the center of the disk D engages turntable 27 through the center hole formed at the bottom of the cartridge C.

In another embodiment of the invention, the cartridge holder 22 is movable up and down relative to the unit chassis 21, and when the cartridge holder 22 is in an upper position the cartridge C in the disk container 13 is transferred into the cartridge holder 22. Once cartridge C is transferred, the cartridge holder 22 moves down toward the unit chassis 21, and the turntable 27, mounted on the unit chassis 21, engages with the center hole of the disk D in the cartridge C.

As shown in FIG. 1, a head 28 and a head drive motor Mc are mounted on the unit chassis 21 of the drive unit 20. The head 28 is moved by the head drive motor Mc in the left-ward and right-ward directions in FIG. 1. When the cartridge C is transferred into the cartridge holder 22 (see FIG. 2A), the shutter of the cartridge C is open, and the head 28 (see FIG. 1) faces the recording surface of the disk D exposed in the opening. Although the head 28 in FIG. 1 is a reproduction-only head, a head capable of performing both recording to, and reproduction from, the disk D may be provided.

The cartridge holder 22 of the drive unit 20 includes a transport roller 29 (See FIG. 1) on the upper front thereof. Transport roller 29 is driven by a motor (not shown). The cartridge C in the disk container 13 is transported to the transport roller 29 by transport member 14, in a direction (d), and then, into the cartridge holder 22 by a rotational force provided by transport roller 29. Conversely, when the cartridge C in the cartridge holder 22 is transported toward the disk container 13 by the transport roller 29 to a transport limit, cartridge holder 22 is brought back completely into the disk container 13 by the movement of the transport member 14 in the direction (c). However, while the cartridge C is being transported by the transport roller 29, the claw 14a of the transport member 14 retreats from the movement area of the cartridge C to the left side of FIG. 1

As shown in FIG. 1, an eject member 31 is mounted on the right rear side of the disk container 13, and pivotally supported by a support shaft 32 fixed to the movable base 16. The eject member 31 has an eject presser portion 31a at the leading edge thereof. When an eject operation is not being performed, the eject presser portion 31a is, as shown in FIG. 1, positioned behind (towards the top of the page in FIG. 1) the cartridge C in the disk container 13, and in front of (towards the bottom of the page in FIG. 1) the cartridge C. Therefore, eject presser portion 31a is held in the cartridge holder 22 so as not to obstruct the movement of the cartridge C between the disk container 13 and the cartridge holder 22.

The support shaft 32 (see FIGS. 1 and 2A) is fixed to the right front end (leading end adjacent to the nose portion 11) of the movable base 16 and an eject drive motor Md is mounted on the movable base 16 on the side of the support shaft 32. In addition, a slider 33 is mounted movably in directions (i)–(j) (See FIG. 1), on the movable base 16. Power from the eject drive motor Md is transmitted by a train of reduction gears (not shown) to a pinion (not shown) which engages a rack (not shown) formed on the slider 33. Therefore, the slider 33 is moved in the directions (i)–(j) (see FIG. 1) by the power of the eject drive motor Md. The slider 33 has a slot 33a in which a pin 34, which is fixed to the eject member 31, is slidably fitted. When the slider 33 moves in the direction (i), the eject member 31 is pivoted about the support shaft 32 in a clockwise direction, and when the slider 33 moves in the direction (j), the eject member 31 is pivoted about the support shaft 32 in a counter-clockwise direction.

The eject drive motor Md serves as an eject drive source for operating the eject member 31. The eject drive motor Md, the slider 33, the train of reduction gears, the pinion and the rack constitute an eject drive mechanism for operating the eject member 31.

Figure 6:
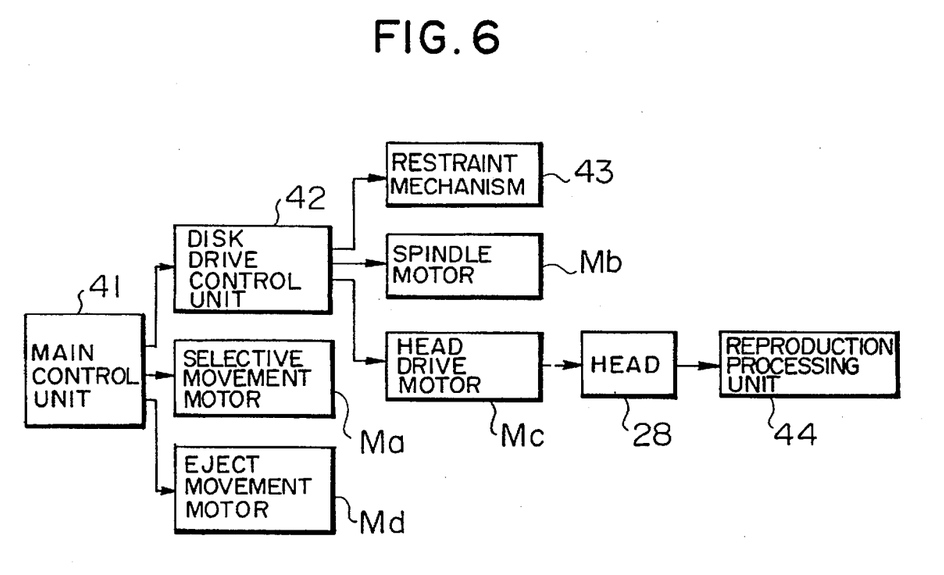
FIG. 6 is a circuit block diagram of the disk system according to the invention.

FIG. 6 is a block diagram of one embodiment of the invention showing an electric control circuit of a disk system according to the invention.

A main control unit 41 comprises a microcomputer or the like. A command from the main control unit 41 is given to a disk drive control unit 42 which controls the operation of the drive unit 20 (see FIG. 1) as a disk drive. The spindle motor Mb for driving the turntable 27 and the head drive motor Mc for moving the head 28 are also controlled by the disk drive control unit 42. A restraint mechanism 43 for moving the restraint members 26 shown in FIG. 2B is also controlled by the disk drive control unit 42. A read signal from the head 28 is transmitted to a reproduction processing unit 44 and decoded into a voice signal.

The selective movement motor Ma and the eject drive motor Md are controlled by the main control unit 41. In other words, the eject drive motor Md, acting as an eject drive source for operating the eject member 31, is controlled independent of the movement of the spindle motor Mb, the head drive motor Mc, and the restraint mechanism 43 in the drive unit 20.

A motor driver circuit (not shown) is mounted between the control units 41 and 42. Motors Ma, Mb, Mc and Md, and the motor drivers are controlled by the control unit 41 or 42 to drive the motors Ma, Mb, Mc and Md.

The operation of the disk system with mini-disks (MDs) according to the invention, and as discussed above, will now be described. Operation of the disk system with compact disks (CDs) is also possible and would include substantially identical steps.

Cartridges C (containing disks D) are inserted in the disk holders A1, A2 and A3 (see FIG. 3) of the disk container 13 through the insertion slot 11a when the cover 12 in front of the nose portion 11 is open as shown in FIG. 4B. When the insertion or ejection of the cartridges C is not being performed, the cover 12 is closed as shown in FIG. 4A.

Reproduction, i.e., playing, of any one of the cartridges C held in the disk holders A1 to A3 is selected by pushing the control buttons 12b provided on the front surface 12a of the cover 12 (See FIG. 4A). For example, when the cartridge C held in the disk holder A2 is selected, the selective movement motor Ma is controlled by the main control unit 41 and the screw shaft 17 (See FIG. 2) is rotated. The rotation of the screw shaft 17 moves the movable base 16 up or down selectively, so that cartridge holder 22 (See FIG. 2A) in the drive unit 20, which is supported in the movable base 16, faces the selected disk holder A2. Once cartridge holder 22 is correctly positioned, the selective movement motor Ma stops its rotation. The stop rotation control may be performed based on a detection signal from an electric detection switch or the like (not shown) which detects the up-and-down position of the drive unit 20. In another embodiment of the invention, stop rotation control may be based on the detection of the proper number of rotations of the screw shaft 17 from the starting position where the drive unit 20 reaches the bottommost position of its movement.

When no cartridge C is to be transferred in the cartridge holder 22, the restraint members 26 are shifted in the direction (h) (See FIG. 1), by the restraint mechanism 43 (See FIG. 6), and the lock shafts 25 are each held by the minor diameter portion of the restraint hole 26a (See FIG. 2B). In this manner, the drive unit 20 is restrained relative to the movable base 16. The eject drive motor Md is controlled by the main control unit 41 (see FIG. 6), and the slider 33 (See FIG. 1) is moved in the direction (i), whereby the eject member 31 is pivoted clockwise, and the eject presser portion 31a at the leading edge of the eject member 31 is moved to the position indicated by a solid line of FIG. 1.

When the cartridge holder 22 of the drive unit 20 stops in a position opposed to the disk holder A2, the claw 14a of the transport member 14, located on the side of the disk holder A2, engages the groove Ca of the cartridge C, and the transport member 14 is moved in the direction (d) (See FIG. 1). This action causes the cartridge C in the disk holder A2 to be transported into the cartridge holder 22 (see FIG. 2A).

Once the cartridge C is partially transported into cartridge holder 22, the cartridge C is completely transferred into the cartridge holder 22 by the transport roller 29 (see FIG. 1). At this time, the turntable 27 is in a retreat position, i.e., shifted downward from the cartridge holder 22. When the cartridge C is transferred into the cartridge holder 22, the turntable 27 moves upward and engages the center of the disk D in the cartridge C (see FIG. 2A).

Immediately after the cartridge C is transferred into the cartridge holder 22, the restraint mechanism 43 (See FIG. 6) is controlled, and the restraint members 26 are moved in the direction (g) (see FIG. 1), the lock shafts 25 are each moved into the major diameter portion of the restraint hole 26 (see FIG. 2B), and the restraint on the drive unit 20 relative to the movable base 16 is released. As a result, the drive unit 20 is elastically supported by the dampers 24 relative to the movable base 16 (see FIG. 1). In this elastic support state, the disk D is driven by the turntable 27 and a reproducing (or recording) operation is carried out by the head 28.

When the reproducing operation for the disk D in the cartridge C is completed, the restraint members 26 are first moved by the restraint mechanism 43 in the direction (h) (See FIG. 1), and the drive unit 20 is put into a restrained state relative to the movable base 16. After that, the turntable 27 and the center of the disk D are disengaged from each other, and the cartridge C is returned into the initial position of the disk holder A2 by the transport roller 29. When the cartridge C is separated from the transport roller 29, the claw 14a of the transport member 14 engages the groove Ca, and the cartridge C is thereby returned into the disk holder A2 by the transport force of the transport member 14 in the direction (c) (See FIG. 1).

As described above, when the cartridge C is inserted in, or ejected from, the cartridge holder 22, the drive unit 20 is restrained by the restraint members 26 and positioned relative to one of the selected disk holders. During reproducing operations or the like, the restraint provided by the restraint members 26 is released, and the drive unit 20 is elastically supported by the dampers 24 relative to the movable base 16. This prevents head 28 and the like from being damaged by vibrations.

The operation of ejecting one of the cartridges C held in the disk holders A1 to A3 of the disk container 13 will now be described.

The eject control buttons 11c are provided on the front surface of the nose portion 11. Access and activation of eject control buttons 11C is possible when the cover 12 is pivoted to position (b) (See FIG. 2A) ahead of the nose portion 11 and the insertion slot 11a is exposed as shown in FIG. 4B. For example, if the ejection of the cartridge C in the topmost disk holder A1 is designated by the eject control buttons 11c, the driving of the selective movement motor Ma is controlled by the main control unit 41 (see FIG. 6), which causes the screw shaft 17 (see FIG. 2A) to rotate, and the movable base 16 to move upward. When the cartridge holder 22 in the drive unit 20 faces the topmost disk holder A1, the selective movement motor Ma stops. At this time, the eject member 31, supported by the support shaft 32 fixed to the movable base 16, moves upward together with the drive unit 20. Then, with the cartridge holder 22 stopped in a position opposite to the disk holder A1, the eject member 31 faces the side of the topmost slit S1 formed on the disk container 13 (See FIG. 3).

The eject drive motor Md, as an eject drive source, is driven according to an order from the main control unit 41

(See FIG. 6). The slider 33, as a drive member component of the eject drive mechanism, moves in the direction (j), which causes the eject member 31 to be pivoted about the support shaft 32 counterclockwise (see FIG. 1). Then, the eject presser portion 31a, at the leading end of the eject member 31, intrudes in the slit S1 (see FIG. 3) and presses the rear end of the cartridge C in the disk holder A1, so that the cartridge C in the disk holder A1 is ejected from the insertion slot 11a as shown by a broken line in FIG. 1.

The movement of the eject member 31 to eject the cartridge C is thus controlled by the up-and-down movement of the movable base 16. This movement is the same as the selective movement of the cartridge holder 22 to the disk holder A1, A2 or A3 in order to take the cartridge C into the drive unit 20. In other words, the selective movement for taking the cartridge C out from the disk container 13 and the selective movement for positioning the eject member 31 to oppose any disk holder are performed by the same control operation of the main control unit 41 (see FIG. 6). This reduces the load on the control operation of the main control unit 41.

As shown in the block diagram of FIG. 6, the eject drive motor Md, operating as an eject drive source for operating the eject member 31, and the selective movement motor Ma, used for opposing the eject member to any disk holder, are controlled by the main control unit 41 regardless of the operation state of the spindle motor Mb, the head drive motor Mc, and the restraint mechanism 43. Accordingly, it is possible to operate the eject member 31 and eject an arbitrary cartridge regardless of the state of the drive unit 20.

For example, even if the drive unit 20 is not restrained by the restraint members 26, the cartridge C is held in the cartridge holder 22, and the disk D is being rotationally driven by the turntable 27 to be reproduced by the head 28, so that a second cartridge C can be ejected.

When the cover 12 is opened and an operation for ejecting the cartridge C in the bottom-most disk holder A3 is selected and the cartridge C taken out from the disk holder A2 is held in the cartridge holder 22 and the disk D therein is being driven by the turntable 27 to be reproduced, the driving of the selective movement motor Ma is controlled by the main control unit 41, the screw shaft 17 is rotated and the movable base 16 is moved downward while the cartridge C from the disk holder A2 is held in the cartridge holder 22 and the disk D therein is being driven for reproduction. When the eject member 31 faces the side of the bottom-most slit S3 shown in FIG. 3, the selective movement motor Ma stops its rotation.

With no reference to the movement in the drive unit 20, the eject drive motor Md is controlled by the main control unit 41, the slider 33 is moved in the direction (j) (see FIG. 1), and the eject member 31 is pivoted about the support shaft 32 in the counterclockwise direction. This causes the eject presser portion 31a to intrude into the slit S3 and the cartridge C in the bottommost disk holder A3 (see FIG. 3) to be ejected through the insertion slot 11a (see FIG. 4B).

Once the cartridge C in the bottommost disk holder A3 is ejected, the drive unit 20 is moved to a position opposite to the middle disk holder A2 by the selective movement motor Ma, and the cartridge C, whose reproduction has been completed, is returned into the initial disk holder A2.

As described above, the selective movement motor Ma for positioning the eject member 31 opposite to any of the disk holders A1 to A3 and the eject drive motor Md for pivoting the eject member 31 are controlled with no reference to the operation state of the spindle motor Mb and the head 28 in the drive unit 20. Therefore, it is possible to eject an arbitrary cartridge C in the disk container 13 in any state, for example, when no cartridge C is held in the drive unit 20, or when the cartridge C is held in the cartridge holder 22 and the disk D therein is not being driven for reproduction, or when reproduction of the disk D is being performed.

However, when the cartridge C taken from the disk holder A2 is held in the cartridge holder 22 of the drive unit 20, if an eject operation of the cartridge C in the disk holder A2 is designated, a reproducing operation is interrupted, the cartridge C is returned from the cartridge holder 22 into the disk holder A2, and then, cartridge C is ejected by the eject member 31.

In the embodiment of the invention shown in FIG. 1, the eject member 31 is pivoted in correlation to the slider 33. The slider 33, the eject drive motor Md, the train of reduction gears, and the rack constitute the eject drive mechanism. For example, the eject member 31 may be urged by a spring member (not shown) in the clockwise direction in FIG. 1 and pressed counterclockwise by a drive member which is linearly driven by the eject drive motor Md. Furthermore, the cartridge C in the disk container 13 may be ejected in correlation to the linear movement of the eject member 31.

Figure 5:
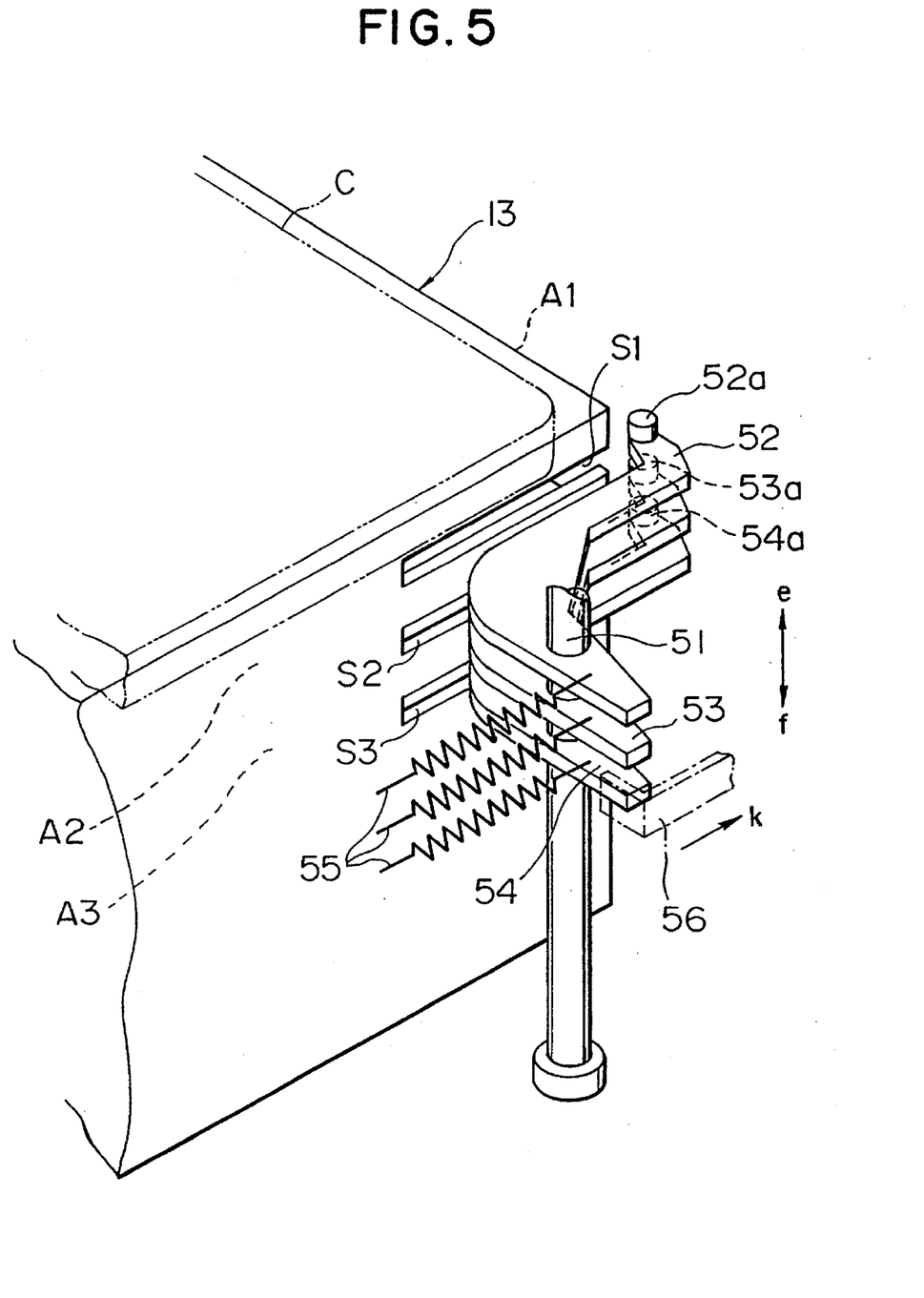
FIG. 5 is a perspective view showing an eject member according to another embodiment of the invention.

FIG. 5 illustrates another embodiment for operating an eject member. In this embodiment, a support shaft 51 is fixed to a mechanism chassis 15 in the housing 10 (see FIG. 1) on the side of the disk container 13. A plurality of (three in FIG. 5) eject members (also called eject arms) 52, 53 and 54 are pivotally supported on support shaft 51. The eject members 52, 53 and 54 are so positioned on the side of slits S1, S2 and S3 formed in the disk container 13 as to respectively intrude in the slits S1, S2 and S3. Eject members 52, 53 and 54 are urged by a tensile spring 55 acting as a spring member or an urging member in the clockwise direction, that is, in a direction to prevent eject members 52, 53 and 54 from intruding in the slits S1, S2 or S3. Furthermore, the eject members 52, 53 and 54 are each restrained by a stopper (not shown not to pivot further clockwise from the position shown in FIG. 5. On the other hand, the movable base 16 is provided with a drive member 56 driven by an eject drive motor Md in a direction (k).

In order to eject a cartridge C positioned, for example, in the bottommost disk holder A3, the movable base 16 is moved to the bottommost selecting position while a reproducing operation of a disk D is performed in the drive unit 20. At this time, the drive member 56 faces the bottommost eject member 54. When the drive member 56 is moved in the direction (k), the eject member 54 is pivoted counterclockwise, an eject presser portion 54a thereof intrudes in the slit S3, and the cartridge C in the disk holder A3 is ejected from the insertion slit 11a.

Although the eject members 31, 52, 53 and 54 are driven by the eject drive motor Md in the above embodiments of the invention, in another embodiment of the invention, a solenoid may be used as an eject drive source for driving the eject members 31, 52, 53 and 54 instead of the motor Md.

Furthermore, in the above embodiments, the eject drive motor Md, the slider 33, and the eject member 31 constituting the eject drive mechanism and the drive member 56 shown in FIG. 5 are also mounted on the movable base 16 supporting the drive unit 20 and allowed to move to a position opposed to the slit S1, S2 or S3 by the selective movement of the movable base 16. A base or a chassis which moves up and down (selectively) in the housing 10 may be provided separately from the movable base 16 supporting the drive unit 20 to mount the eject drive motor Md, the eject member 31 or the drive member 56 thereon. However, the mounting of the eject drive motor Md, the eject member 31, or the drive member 56 on the movable base 16 supporting the drive unit 20 allows selection of a disk to be ejected in the same operation as the selective movement operation of the drive unit 20, thereby simplifying the structure of the system and the control operation.

The number of cartridges C or disks D inserted in the disk container 13 is not limited to three, and may be more than three. A disk unprotected by a cartridge, such as a compact disk (CD), may be placed directly into the disk holder in the disk container 13 through the insertion slot. Furthermore, a disk for a CD-ROM, a magnetic disk, or the like may be used instead of the mini-disk, and the disk system may be not only be used on-board an automobile, but can also be used for home or office.

As described above, according to the present invention, it is possible to eject an arbitrary disk from a disk container whether or not that disk or another disk is loaded into a disk drive and is even being driven for reproduction (i.e., playing) or recording in the disk drive. Therefore, for example, when one disk is being reproduced, another disk can be exchanged, and the convenience is enhanced. Since a cartridge which is not loaded in the disk drive can be ejected immediately without interrupting the reproducing operation, speedy ejection can be achieved.

In order to position the eject member opposite to any disks, it is only necessary to move the movable base supporting the disk drive. Therefore, a special mechanism for selectively moving only the eject member is not needed. In other words, a movement drive source of the movable base for taking out any disk from the disk container into the disk drive can also serve as a drive source for the selective movement of the eject member, by which the structure of the system can be simplified.

What is claimed is:

1. A disk system comprising:
   a housing including an insertion portion through which a plurality of disks are insertable into the housing;
   a disk container mounted in the housing for storing the plurality of disks inserted through the insertion portion;
   a movable base disposed in the housing adjacent the disk container;
   a disk drive mounted on the movable base for receiving and driving a first disk stored in the disk container;
   an eject drive source for driving the eject member such that the eject member ejects the second disk from the disk container through the insertion portion; and
   a control unit for controlling said disk drive and said eject drive source such that, while the first disk is driven by the disk drive, the second disk is ejected by the eject member through the insertion portion.

2. A disk system according to claim 1, wherein said disk container comprises a plurality of disk holders, each of said disk holders receiving one of said plurality of disks inserted through said insertion portion.

3. A disk system according to claim 2, further comprising:
   a movement drive source for moving said movable base in response to a command from said control unit such that said disk drive is selectively positioned opposite a selected one of said disk holders of said disk container.

4. A disk system according to claim 3, wherein, in response to a first command from said control unit, said movement drive source operates to move both said disk drive and said eject member to a position opposite a selected disk holder where, in response to a second command from said control unit, said eject drive source causes said eject member to eject the second disk from said selected disk holder while said first disk is loaded in said disk drive.

5. A disk system according to claim 1, wherein said control unit independently controls a disk drive control unit operatively coupled to said disk drive.

6. A disk system according to claim 3, wherein said control unit independently controls said movement drive source.

7. A disk system according to claim 1, wherein said control unit independently controls said eject drive source.

8. A disk system according to claim 3, further comprising:
   a plurality of slits formed in said disk container, each of said slits corresponding to one of said disk holders of said disk container,
   wherein when said second disk stored in said disk container is selected by said control unit to be ejected, said control unit directs said movable base to position said eject member adjacent a slit, corresponding to the disk holder containing said second disk, and said control unit directs said eject drive source to cause said eject member to intrude into said slit whereby said second disk is ejected from said disk holder through said insertion portion.

9. The disk system according to claim 1, wherein said disks are compact disks.

10. The disk system according to claim 1, wherein said disks are mini-disks.

11. The disk system according to claim 1, wherein said disks are magnetic disks.

12. A disk system according to claim 8, wherein said eject member comprises a plurality of eject arms, each eject arm corresponding to one of said slits formed in said disk holders of said disk container.

13. The disk system according to claim 12, further comprising:
   a drive member mounted on said movable base for selecting and driving any one of said plurality of eject arms, said drive member being driven by said eject drive source,
   wherein when said second disk stored in said disk container is selected by said control unit to be ejected, said control unit directs said movable base to position said drive member adjacent an eject arm corresponding to the disk holder containing said second disk and said control unit directs said drive member to cause said selected eject arm to intrude into said slit, whereby said second disk is ejected from said disk holder through said insertion portion.

14. A disk system comprising:
   a housing;
   a nose portion attached to a front of said housing;
   an insertion portion formed in said nose portion through which a plurality of disks can be individually inserted;
   a disk container coupled to said insertion portion for receiving and holding said disks inserted through said insertion portion;
   a disk drive coupled to said disk container for receiving and driving a first selected one of said disks held in said disk container;
   a movable base supporting said disk drive;
   a movement drive source coupled to said movable base for positioning said disk drive opposite the first selected one of said disks held in said disk container;

an eject member for ejecting a second selected one of said disks held in said disk container through said insertion portion;

an eject drive source operatively coupled to said eject member; and a control unit for controlling said eject drive source to elect the second selected one of said disks from said disk container through said insertion portion while said first selected one of said disks is loaded in said disk drive, wherein said eject member and said disk drive are moved together by said movement drive source and positioned to eject the second selected one of said disks held in said disk container through said insertion portion.

15. A disk system according to claim 14, further comprising:

an eject button for selecting ejection of any disk in said disk container, said eject button being positioned on a front of said nose portion; and a cover movably attached to said nose portion, said cover having a first position and a second position, wherein said eject button is exposed and operable when said cover is in said first position.

* * * * *